(12) United States Patent
Hwang et al.

(10) Patent No.: US 9,059,916 B2
(45) Date of Patent: Jun. 16, 2015

(54) APPARATUS AND METHOD FOR TRANSMITTING PACKETS IN A COMMUNICATION SYSTEM

(75) Inventors: Hyo-Sun Hwang, Suwon-shi (KR); Kyung-Hun Jang, Suwon-shi (KR); Sung-Hyun Choi, Seoul (KR); Young-Soo Kim, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1350 days.

(21) Appl. No.: 10/782,193

(22) Filed: Feb. 19, 2004

(65) Prior Publication Data

US 2004/0179475 A1 Sep. 16, 2004

(30) Foreign Application Priority Data

Mar. 13, 2003 (KR) .................................. 2003-15735

(51) Int. Cl.
| | | |
|---|---|---|
| *G01R 31/08* | (2006.01) | |
| *H04J 1/16* | (2006.01) | |
| *H04L 12/26* | (2006.01) | |
| *H04L 12/801* | (2013.01) | |
| *H04L 12/851* | (2013.01) | |
| *H04L 12/805* | (2013.01) | |

(Continued)

(52) U.S. Cl.
CPC ................ *H04L 47/10* (2013.01); *H04L 47/14* (2013.01); *H04L 47/15* (2013.01); *H04L 47/24* (2013.01); *H04L 47/36* (2013.01); *H04L 47/41* (2013.01); *H04W 28/22* (2013.01); *H04W 28/24* (2013.01)

(58) Field of Classification Search
CPC ..... H04L 47/10; H04L 47/2441; H04L 47/41; H04L 43/026; H04L 45/245
USPC .......................... 370/230, 235, 236, 389, 465
See application file for complete search history.

(56) References Cited

U.S. PATENT DOCUMENTS

| | | | |
|---|---|---|---|
| 5,434,855 A | * | 7/1995 | Perlman et al. ................ 370/394 |
| 6,048,909 A | | 4/2000 | Chaudhary et al. |

(Continued)

FOREIGN PATENT DOCUMENTS

| | | |
|---|---|---|
| JP | 56-030343 | 3/1981 |
| JP | 58-57939 | 4/1983 |

(Continued)

OTHER PUBLICATIONS

Kessler et al., "An End-to-End Quality of Service Management Architecture for Wireless ATM Networks", Proceedings of the 32$^{nd}$ Hawaii International Conference on System Sciences, 1999 IEEE, pp. 1-10.

(Continued)

*Primary Examiner* — Ayaz Sheikh
*Assistant Examiner* — Mounir Moutaouakil
(74) *Attorney, Agent, or Firm* — NSIP Law

(57) ABSTRACT

An apparatus and method for transmitting packets in a communication system. The packet transmission method for the communication system includes the steps of a) receiving Quality of Service (QoS) information and data rate information from an upper layer, b) receiving channel status information of wireless stations from a lower layer, and c) creating an aggregation packet according to the received information, and transmitting the created aggregation packet to a Media Access Control (MAC) layer.

11 Claims, 8 Drawing Sheets

(51) Int. Cl.
H04L 12/891 (2013.01)
H04W 28/24 (2009.01)
H04W 28/22 (2009.01)

(56) References Cited

U.S. PATENT DOCUMENTS

| | | | | |
|---|---|---|---|---|
| 6,216,167 B1 * | 4/2001 | Momirov | | 709/238 |
| 6,341,145 B1 | 1/2002 | Hioe et al. | | |
| 6,574,195 B2 * | 6/2003 | Roberts | | 370/235 |
| 6,721,334 B1 * | 4/2004 | Ketcham | | 370/473 |
| 6,819,658 B1 * | 11/2004 | Agarwal et al. | | 370/316 |
| 6,842,446 B2 * | 1/2005 | Everson et al. | | 370/349 |
| 6,882,655 B1 | 4/2005 | Isoyama et al. | | |
| 7,263,064 B2 | 8/2007 | Yoshimura et al. | | |
| 7,269,171 B2 * | 9/2007 | Poon et al. | | 370/392 |
| 7,274,711 B2 * | 9/2007 | Kajizaki et al. | | 370/473 |
| 7,376,155 B2 * | 5/2008 | Ahn et al. | | 370/503 |
| 2003/0169699 A1 * | 9/2003 | Haardt | | 370/316 |
| 2004/0018016 A1 * | 1/2004 | O'Mahony et al. | | 398/43 |
| 2004/0174877 A1 * | 9/2004 | Masputra et al. | | 370/392 |
| 2004/0179475 A1 | 9/2004 | Hwang | | |
| 2004/0179486 A1 * | 9/2004 | Agarwal et al. | | 370/316 |
| 2006/0039285 A1 * | 2/2006 | Chapman et al. | | 370/235 |

FOREIGN PATENT DOCUMENTS

| | | |
|---|---|---|
| JP | 58-57939 B2 | 12/1983 |
| JP | 63-90942 | 4/1988 |
| JP | 64-071360 | 3/1989 |
| JP | 64-71360 A | 3/1989 |
| JP | 01-241243 | 9/1989 |
| JP | 1-241243 A | 9/1989 |
| JP | 02-166856 | 6/1990 |
| JP | 02-268046 | 11/1990 |
| JP | 2-268046 A | 11/1990 |
| JP | 05-083157 | 4/1993 |
| JP | 8-97857 | 4/1996 |
| JP | 08-204629 | 8/1996 |
| JP | 08-256149 | 10/1996 |
| JP | 10-257097 | 9/1998 |
| JP | 2000-049864 | 2/2000 |
| JP | 2000-224226 | 8/2000 |
| JP | 2000-236332 A | 8/2000 |
| JP | 2000-295313 | 10/2000 |
| JP | 2000-324168 | 11/2000 |
| JP | 2001-16226 | 1/2001 |
| JP | 2001-094574 | 4/2001 |
| JP | 2001-203754 | 7/2001 |
| JP | 2001-244947 | 9/2001 |
| JP | 2001-298477 | 10/2001 |
| JP | 2001-326648 | 11/2001 |
| JP | 2001-344228 | 12/2001 |
| JP | 2002-26991 | 1/2002 |
| JP | 2002-271366 | 9/2002 |
| JP | 2002-531657 | 9/2002 |
| JP | 2004-511127 A | 4/2004 |
| JP | 4046704 B2 | 2/2008 |
| KR | 10-2001-0063754 | 7/2001 |
| KR | 10-2002-0053581 | 7/2002 |
| WO | WO 01/17155 | 3/2001 |
| WO | WO 02/02789 A2 | 1/2002 |
| WO | WO 02/27989 A1 | 4/2002 |

OTHER PUBLICATIONS

Telecommunications and Internet Protocol Harmonization Over Networks (TIPHON) Release 3; End-to-End Quality of Service in TIPHON Systems; Part 3: Signalling and Control of End-to-End Quality of Service (QoS), ETSI TS 101 329-3 V2.1.2, Jan. 2002, pp. 1-45.
Kim, "A Network Service/Providing Wireless Channel Information for Adaptive Mobile Applications: Part I: Proposal", 2001 IEEE, pp. 1345-1351.
Snoeren, "Adaptive Inverse Multiplexing for Wide-Area Wireless Networks", Global Telecommunications Conference—Globecom '99, 1999 IEEE, pp. 1665-1672.
Misra, "Routing Protocols for Ad Hoc Mobile Wireless Networks", Internet Website, Feb. 2000, pp. 1-20.
Korean Office Action issured on Feb. 22, 2010, in corresponding Korean Application No. 10-2006-0076406 (5 pages).
Japanese Examination Report issued Apr. 24, 2012 in counterpart Japanese Application No. 2010-16789 (8 pages, in Japanese with partial English language translation).
Japanese Office Action issued on Oct. 19, 2010, in corresponding Japanese Patent Application No. 2007-192348 (1 pages).
Japanese Office Action issued Nov. 1, 2011, in counterpart Japanese application No. 2010-16789 (2 pp.).
European Search Report issued on Jun. 23, 2004, in counterpart European Application No. 04006017.0 (4 pages, in English).
Japanese Office Action issued on Jun. 27, 2006, in counterpart Japanese Application No. 2004-069451 (5 pages, in Japanese, including English translation).
Korean Office Action issued on Sep. 18, 2006, in counterpart Korean Application No. 10-2003-0015735 (5 pages, in Korean, including English translation).
Japanese Office Action issued on Mar. 27, 2007, in counterpart Japanese Application No. 2004-069541 (4 pages, in Japanese, including English translation).
Japanese Notice of Allowance issued on Oct. 30, 2007, in counterpart Japanese Application No. 2004-069451 (4 pages, in Japanese, including English translation).

* cited by examiner

Upper Layer Information : a) QoS INFORMATION, b) Data Rate
Mac Layer Information : c) Channel Status

US 9,059,916 B2

APPARATUS AND METHOD FOR TRANSMITTING PACKETS IN A COMMUNICATION SYSTEM

PRIORITY

This application claims priority to an application entitled "APPARATUS AND METHOD FOR PACKET TRANSMITTING IN A COMMUNICATION SYSTEM" filed in the Korean Intellectual Property Office on Mar. 13, 2003, and assigned Application No. 10-2003-0015735, the contents of which are hereby incorporated by reference.

BACKGROUND OF THE INVENTION

1. Field of the Invention

The present invention relates to an apparatus and method for transmitting packet data in a communication system, and more particularly to an apparatus and method for aggregately transmitting packet data in a communication system.

2. Description of the Related Art

Typically, packet data for use in a communication system is transmitted over a transmission media of a lower layer, and a header information is positioned at the front of the packet to perform a transmission control function in a Media Access Control (MAC) layer. Such a packet transmission system adapts an additional frame to perform additional functions such as a connection control, flow control, etc., and assigns a new address to the frame to implement such additional functions.

The packet data transmission system may use idle times according to characteristics of a variety of protocols. For example, an EEE 802.11 MAC protocol using a Carrier Sense Multiple Access (CSMA), prevents a collision between frames using an idle time period such as a Distributed Inter Frame Space (DIFS) or a back-off time, and receives an Acknowledgement (ACK) signal after a lapse of a Short Inter Frame Spacing (SIFS) time after data transmission has been completed.

MAC protocols 10 require some overheads 12 used for transmitting data 14 as shown in FIG. 1. But, these overheads may deteriorate a data throughput of the MAC layer. Therefore, a header compression scheme and a packet aggregation scheme have been adapted to maintain a minimum length of such overheads.

The header compression scheme prevents a header size from being increased when a field length assigned for Internet Protocol (IPv6) addresses is increased and an option field is added.

The packet aggregation scheme is adapted to enhance the data throughput by increasing the length of transmission packets. If overheads having the same lengths are provided and the length of the transmission packet is long, the packet aggregation scheme creates a high data throughput, whereas it creates a low data throughput when the length of the transmission packet is short.

Referring to FIG. 2, overheads 16 having the same size are added to individual packets 22, respectively, to transmit data "1" 18 and data "2" 20. In this case, if the packet aggregation scheme is used, the data "1" 18 and the data "2" 20 are collected in one packet 24, and only one overhead 26 is added to the data "1" 18 and "2" 20, resulting in reduction of required resources due to the omission of one overhead.

However, the aforementioned packet aggregation scheme has the following disadvantages. First, the packet aggregation scheme must assign the same destination address to each of the packets to be transmitted. If packets having different destination addresses are collected and transmitted using a multicast or broadcast address, the packet aggregation scheme cannot receive an ACK signal, resulting in unreliable packet transmission.

Second, the packet aggregation scheme cannot provide users with high Quality of Service (QoS) characteristics. Because packets requiring such QoS characteristics have the same delay and jitter characteristics that must be maintained, a sequential packet aggregation cannot maintain the QoS characteristics.

SUMMARY OF THE INVENTION

Therefore, the present invention has been made in view of the above problems, and it is an object of the present invention to provide an apparatus and method for solving problems created when packets having different destination addresses are collected, and supporting a QoS function.

In accordance with the present invention, the above and other objects can be accomplished by the provision of a packet transmission method for a communication system including the steps of: a) receiving QoS information and data rate information from an upper layer; b) receiving channel status information of wireless stations from a lower layer; and c) creating an aggregation packet according to the received information, and transmitting the created aggregation packet to a MAC layer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
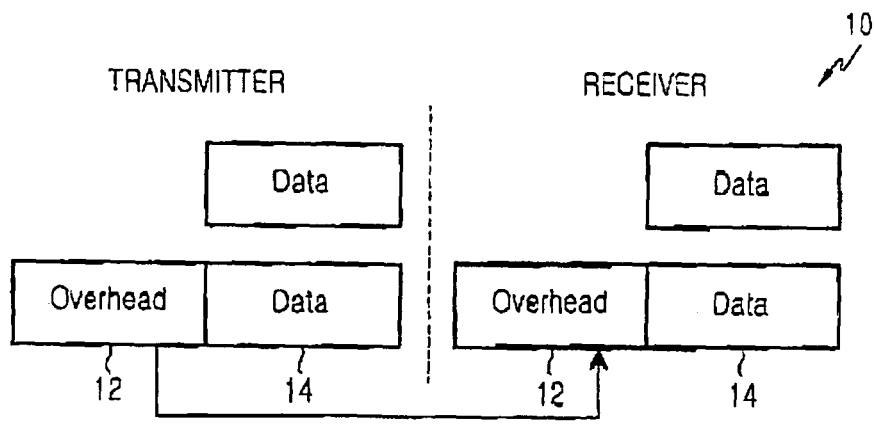
FIG. 1 is a view illustrating a frame structure of conventional packet data.
Figure 2:
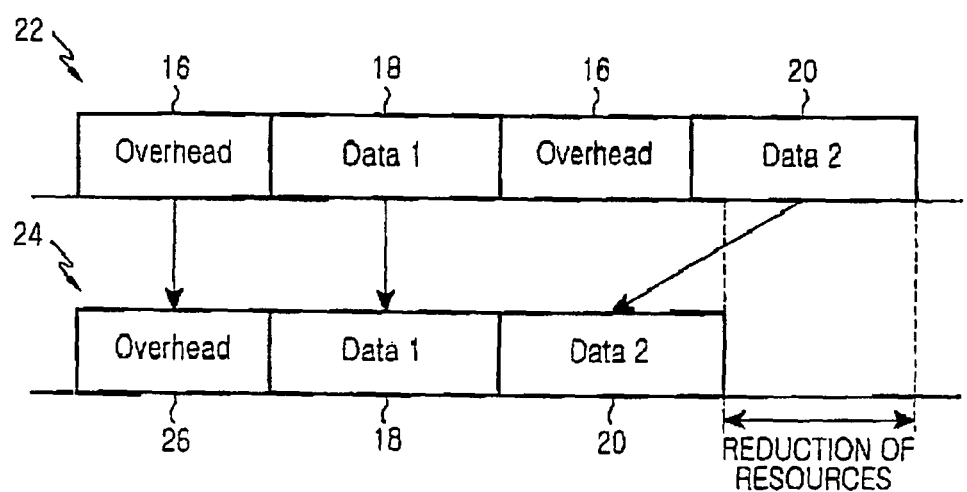
FIG. 2 is a view illustrating a conventional packet aggregation scheme.

Preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

The present invention relates to an apparatus and method for creating/transmitting frames in a communication system.

Figure 3:
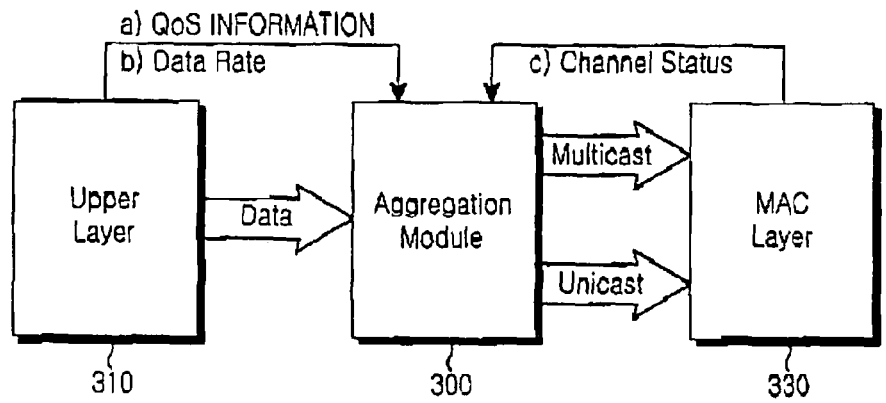
FIG. 3 is a view illustrating a packet aggregation scheme in accordance with a preferred embodiment of the present invention.

The principle of the present invention will now be described in detail with reference to FIG. 3 showing a packet generator. Referring to FIG. 3, the inventive communication system comprises an aggregation module 300, an upper layer 310, and a Media Access Control (MAC) layer 330. The aggregation module 300 collects packets received from the upper layer 310, and transmits the collected packets to the MAC layer 330. The aggregation module 300 creates all determinations associated with the collected packets, and controls the creation and processing of the collected packets. The aggregation module 300 receives Quality of Service (QoS) session information and buffer status information from the upper layer 310, and obtains recognizable data rate information on the basis of the received information. The MAC layer 330 receives channel status information of wireless stations utilizing the present invention. The aggregation module 300 collects packets on the basis of the prior-received information, and transmits an aggregation packet created by the received information to the MAC layer 330.

The present invention adapts an aggregation packet classified into a multicast aggregation packet and a unicast aggregation packet to support a QoS function while solving an aggregation problem of packets having different destination addresses.

Figure 4:
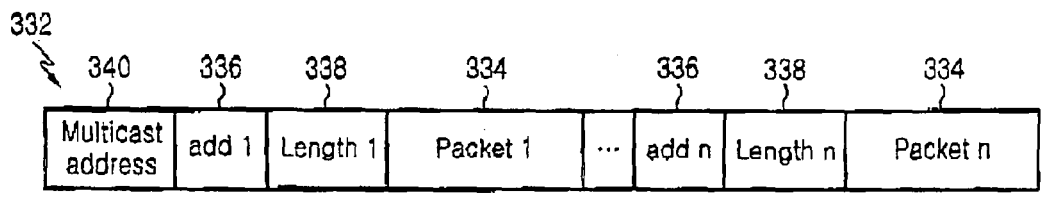
FIG. 4 is a view illustrating a multicast aggregation packet in accordance with a preferred embodiment of the present invention.

Referring to FIG. 4, a multicast aggregation packet 332 includes packets 334 having different destination addresses 336 in one multicast packet. Therefore, a destination address is equal to a multicast address 340, and contains data count information indicating the number of collected data packets. A data section includes a plurality of packet information composed of a destination address 336, a data length 338, and data of individual packets 334.

Figure 5:
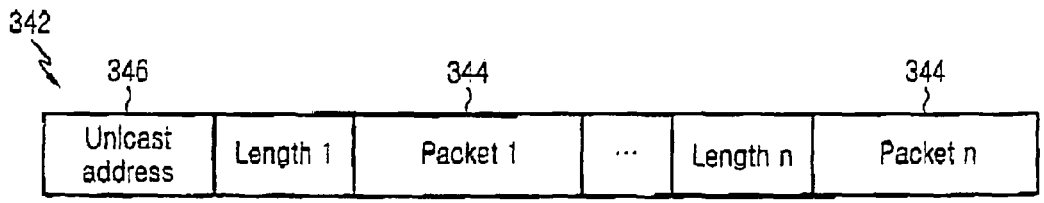
FIG. 5 is a view illustrating a unicast aggregation packet in accordance with a preferred embodiment of the present invention.

Referring to FIG. 5, the unicast aggregation packet 342 collects a plurality of packets 344 having the same destination address 346 in one unicast packet. The unicast aggregation packet 342 does not need a destination address different from the multicast aggregation packet 340 (FIG. 4). Therefore, except for such a destination address, the unicast aggregation packet 342 has the same format as the multicast aggregation packet 332 (FIG. 4).

Figure 6:
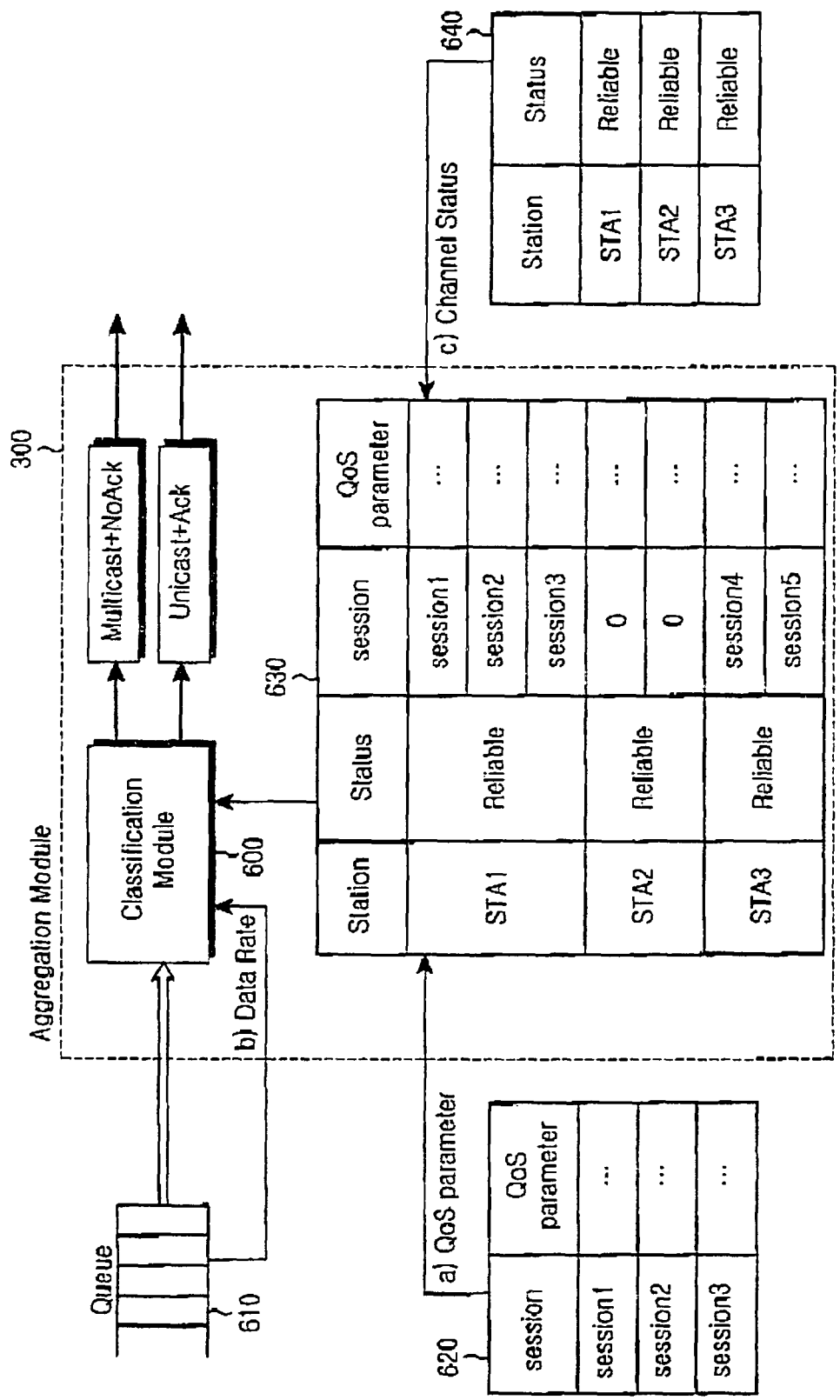
FIG. 6 is a view illustrating a detailed block diagram of an aggregation module shown in FIG. 3 and its associated operation in accordance with a preferred embodiment of the present invention.

Referring to FIG. 6, information downloaded from the upper layer 310 (FIG. 3) to the aggregation module 300 is QoS parameters 620 for every session, and information received from a lower layer is channel status information 640 of individual wireless stations (not shown). The aggregation module 300 receives data rate parameters from a Queue 610 and creates station status table information 630 upon receiving information from the upper 310 (FIG. 3) and lower layers, and transmits the created station status table information 630 to a packet classification module 600. The classification module 600 creates a multicast packet or a unicast packet using a prescribed method and transmits the created packet to the lower layer.

Figure 7:
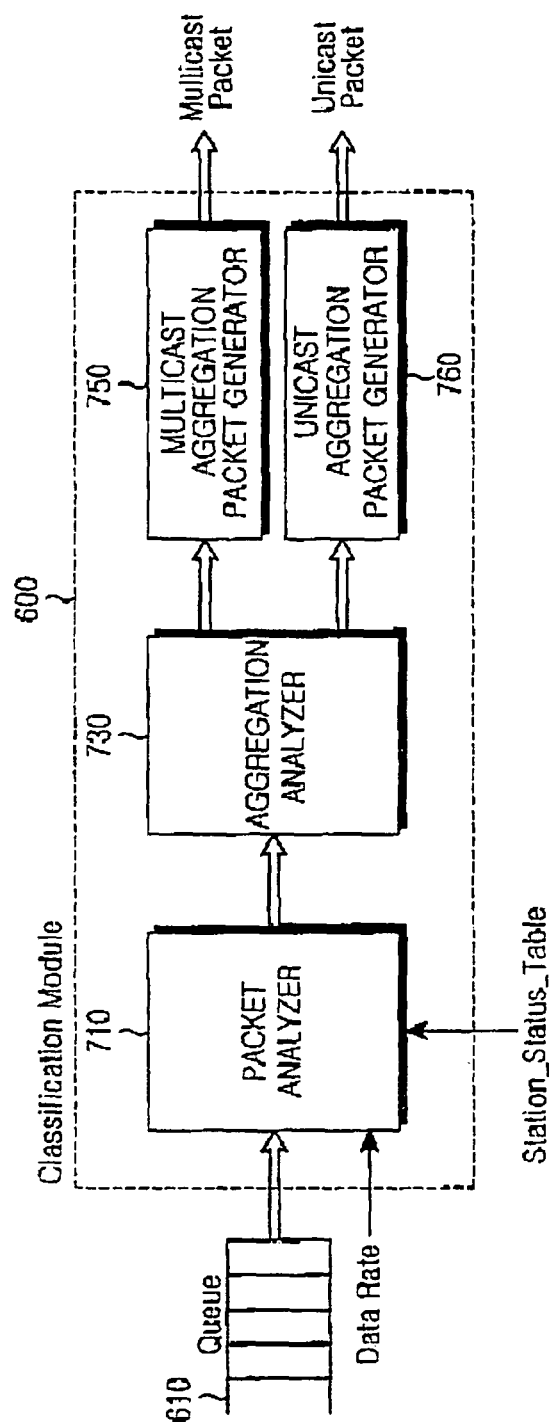
FIG. 7 is a view illustrating a detailed block diagram of a classification module shown in FIG. 6 in accordance with a preferred embodiment of the present invention.

Referring to FIG. 7, the classification module 600 includes a packet analyzer 710 for constructing packets stored in the Queue 610 in the form of a parameter on the basis of the information from the station status table 630 and the data rate from Queue 610, and transmits the constructed packets denoted by parameters to an aggregation analyzer 730. The aggregation analyzer 730 determines how to collect the packets using information received from the packet analyzer 710, and creates grouped packets. Individual grouped packets are transmitted to a multicast aggregation packet generator 750 or a unicast aggregation packet generator 760 according to a control signal of the aggregation analyzer 730. In other words, the aggregation analyzer 730 determines an aggregation method of packets.

Packets having the same QoS method may all be included in the same group, and may be applicable to all aggregation methods. Packets for use in wireless stations having a wireless channel status where a reliable transmission is guaranteed may use a multicast aggregation method. Other packets having other wireless channel status where such a reliable transmission is not guaranteed may use a unicast aggregation method.

The aggregation packet generator is composed of a multicast aggregation packet generator 750 and a unicast aggregation packet generator 760, and creates a multicast aggregation packet or a unicast aggregation packet according to a control signal of the aggregation analyzer 730. In more detail, the multicast aggregation packet generator 750 and the unicast aggregation packet generator 760 collect grouped packets shown in FIGS. 4 and 5. As shown in FIGS. 6 and 7, the multicast aggregation is transmitted to a MAC layer according to a No-ACK policy, and the unicast aggregation is transmitted to the MAC layer according to an ACK policy. Because the multicast aggregation packets are transmitted only to wireless stations for performing reliable transmission, a reliable transmission can be guaranteed even though they are transmitted using the No-ACK policy.

Figure 8:
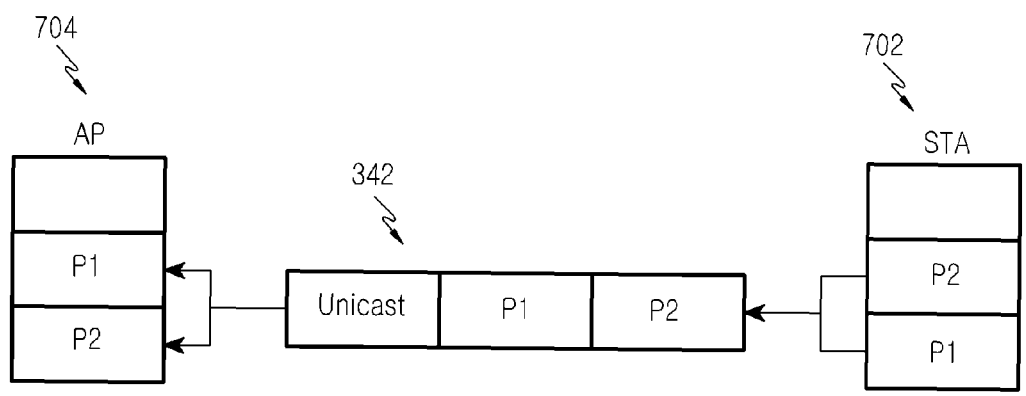
FIG. 8 is a conceptual diagram of the case where a wireless station transmits a packet to a wireless access point in accordance with a preferred embodiment of the present invention.

FIG. 8 shows a conceptual diagram of a wireless station transmitting a packet to a wireless access point in accordance with a preferred embodiment of the present invention. In the shown example an IEEE 802.11 station (STA) 702 transmits packets to a wireless Access Point (AP) 704. The station, 702 serving as a wireless station, unconditionally transmits packets to a wireless AP 704 irrespective of a destination address, such that all packets are transmitted using a unicast aggregation method.

Figure 9:
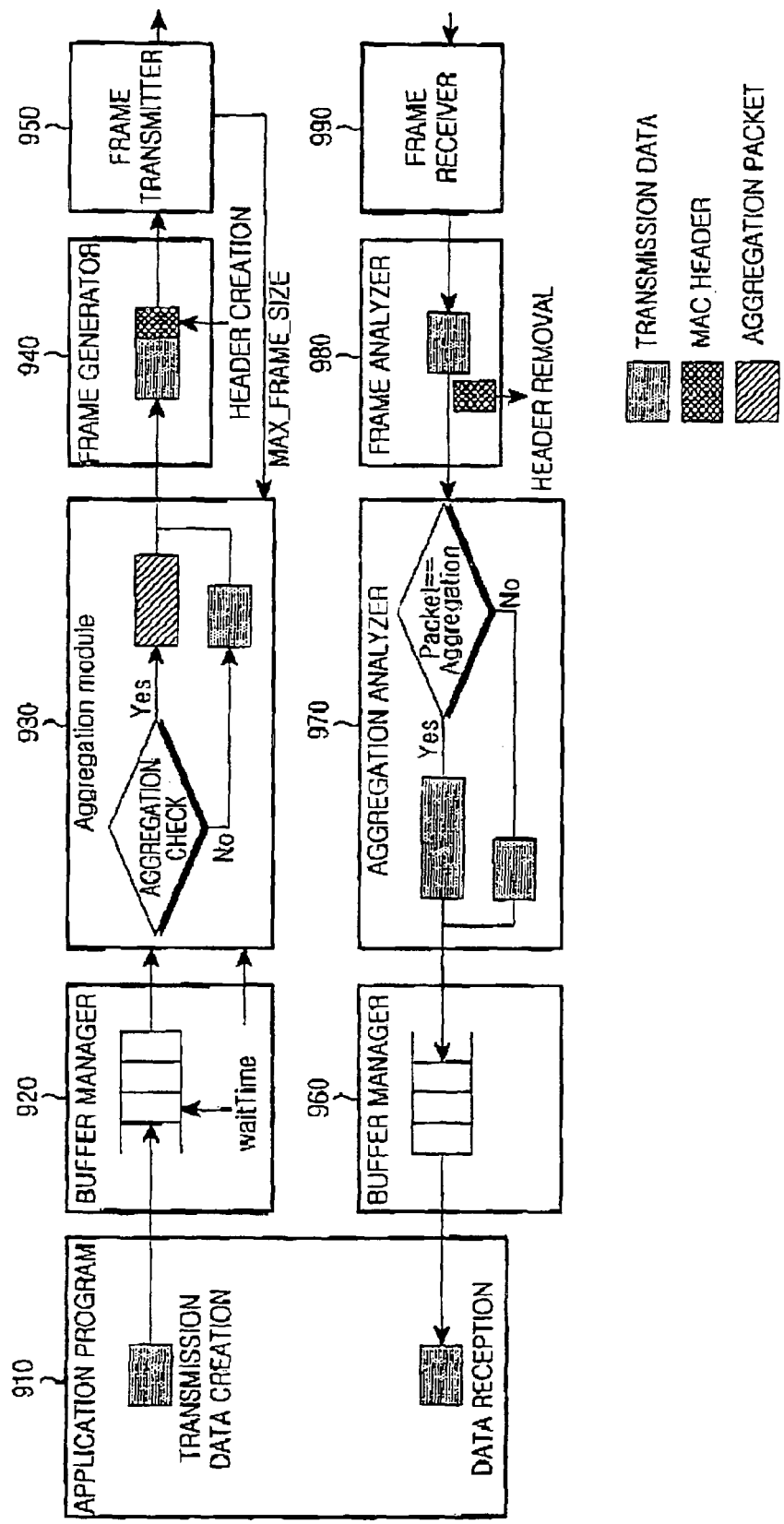
FIG. 9 is a view illustrating transmission/reception operations of aggregation packets for use in a wireless station in accordance with a preferred embodiment of the present invention.

FIG. 9 illustrates transmission/reception operations of aggregation packets for use in a wireless station in accordance with a preferred embodiment of the present invention. The transmission data is created by an application program 910. The created transmission data is stored in a buffer manager 920 and is collected by an aggregation module 930. The aggregation module 930 collects as many packets as MAX_FRAME_SIZE data of a MAC layer on the basis of buffer status information and transmits the collected packets (also called an aggregation packet) to the frame generator 940, which adds a header to the aggregation packet. The aggregation packet having the header is transmitted to an AP 704 (FIG. 8) over a frame transmitter 950.

Packet reception is performed in the order of a frame receiver 990 to a frame analyzer 980 to an aggregation analyzer 970 and then to a buffer manager 960.

Figure 10:
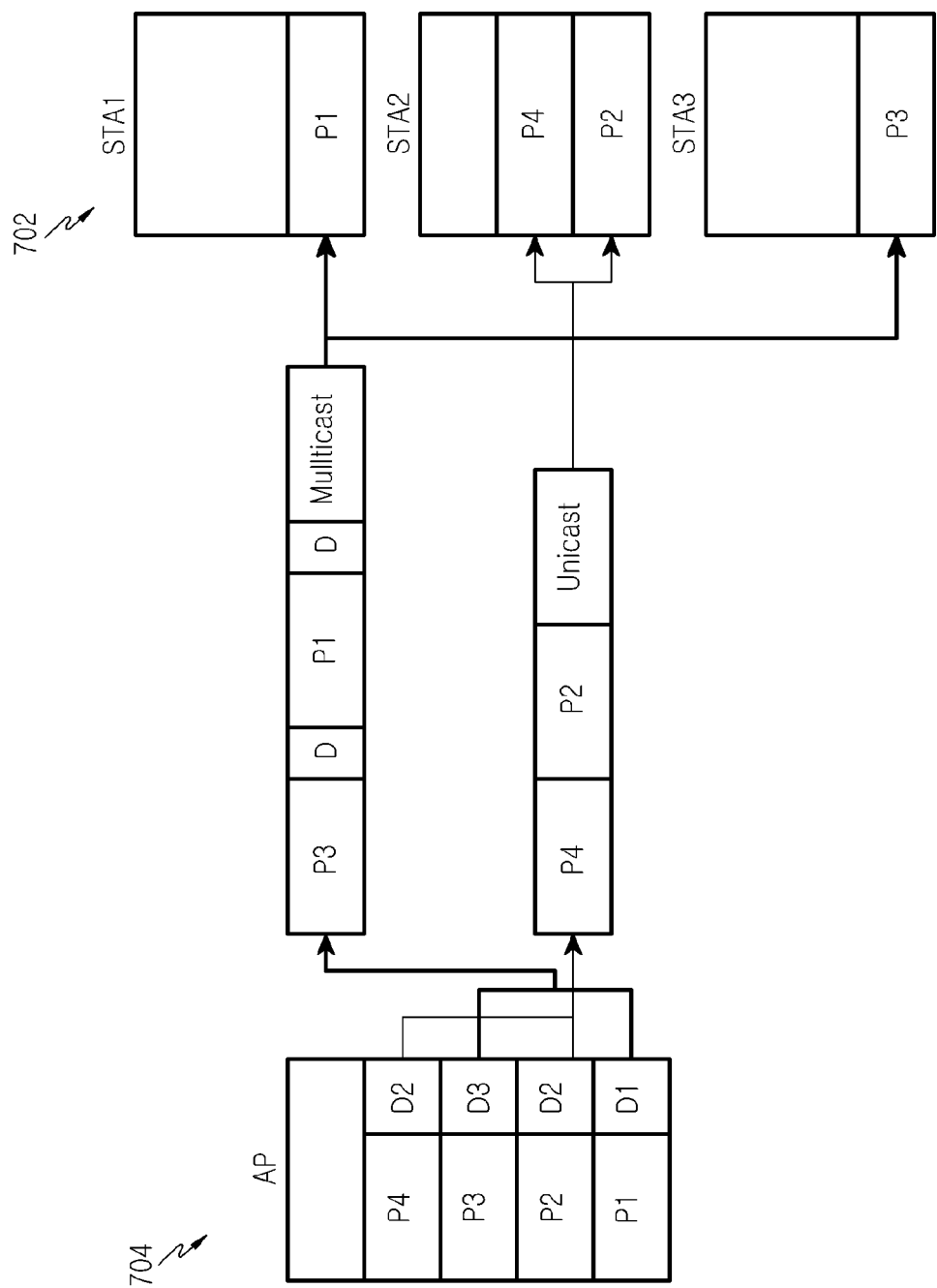
FIG. 10 is a conceptual diagram of the case where a wireless access point transmits a packet to a wireless station in accordance with a preferred embodiment of the present invention.

FIG. 10 illustrates a wireless AP transmitting a packet to an STA 702 in accordance with a preferred embodiment of the present invention. According to channel status information, a wireless AP 704 adapts a multicast aggregation to a wireless station having a reliable channel status and adapts a unicast aggregation to other wireless station having no reliable channel status.

Figure 11:
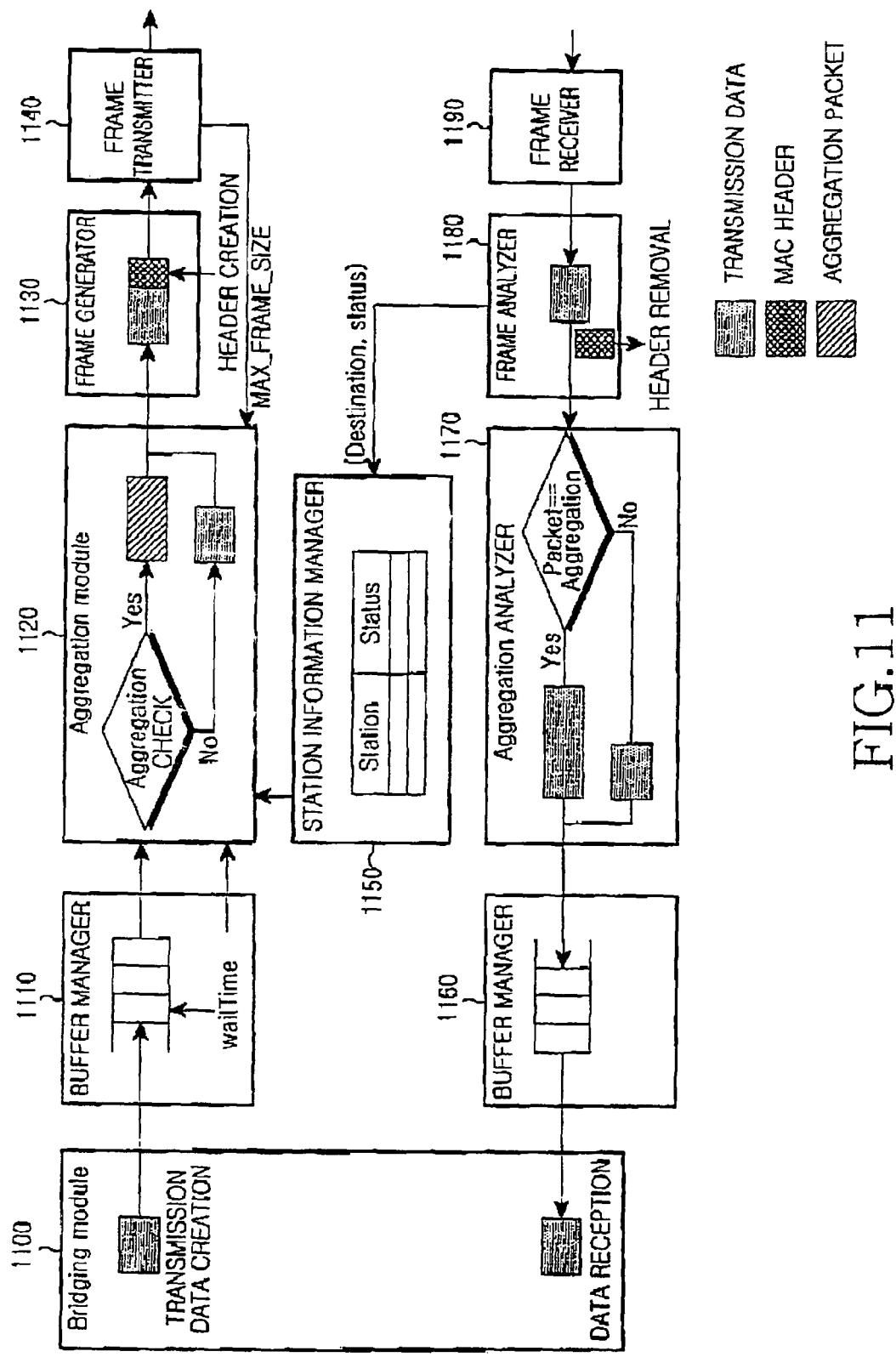
FIG. 11 is a view illustrating transmission/reception operations of aggregation packets at a wireless access point in accordance with a preferred embodiment of the present invention.

FIG. 11 is illustrates transmission/reception operations of aggregation packets at a wireless AP 704 (FIG. 10) in accordance with a preferred embodiment of the present invention, where transmission data is created by a bridging module 1100. The created transmission data is stored in a buffer manager 1110, and is collected by an aggregation module 1120. The aggregation module 1120 collects as many packets as MAX_FRAME_SIZE data of a MAC layer on the basis of buffer status information, and transmits the collected packets (also called an aggregation packet). The frame generator 1130 adds a header to the aggregation packet. The aggregation packet having the header is transmitted to an AP over a frame transmitter 1140. Because the wireless AP needs channel information for every wireless station, the wireless AP stores addresses and channel status information of individual frames in a station information manager 1150 whenever frame reception is accomplished, and then transmits the stored addresses and channel status information to the aggregation module 1120. Upon receiving the stored addresses and channel status information from the wireless AP 704 (FIG. 10), the aggregation module 1120 transmits a packet to a station according to a unicast aggregation scheme and a multicast aggregation scheme.

Packet reception is performed in the order of a frame receiver 1190 to a frame analyzer 1180, to an aggregation analyzer 1170, and then to a buffer manager 1160. The frame analyzer 1180 stores addresses and channel statuses of individual frames in the station information manager 1150 whenever frame reception is accomplished.

As apparent from the above description, the present invention can support a QoS function while solving an aggregation problem of packets having different destination addresses. The present invention creates grouped packets having the same characteristics in consideration of QoS parameters of individual sessions, and then uses a packet aggregation scheme, resulting in no system complexity due to the packet aggregation of an upper layer. That is, there is no need for the MAC layer to further include a QoS scheduler. Such an aggregation method according to the present invention reduces the number of overheads, resulting in an increased data throughput of the MAC layer. The multicast aggregation for use in a wireless station reduces the number of overheads, and increases the data throughput using a No-ACK policy. Because such an aggregation policy exists in an upper layer of a MAC protocol, it can be implemented in the form of a software configuration, such that it can be developed at a low cost within a short period of time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for generating an aggregation packet in a communication system, the apparatus comprising:
    a buffer manager configured to store data packets; and
    an aggregation module configured to receive the data packets from the buffer manager, determine at least two of the received data packets comprising a same destination address and identical quality of service (QoS) information as unicast data packets, determine at least two of the received data packets comprising different destination addresses and identical QoS information as multicast data packets, aggregate the unicast data packets, separately from the multicast data packets, to form a single unicast aggregation packet, and aggregate the multicast data packets, separately from the unicast data packets, to form a single multicast aggregation packet,
    wherein each of the unicast and multicast aggregation packets comprises at least two data sections and a header comprising a destination address,
    wherein the unicast aggregation packet comprises the header comprising the destination address that is identical to the destination address included in a header of each of the unicast data packets, and
    wherein the multicast aggregation packet comprises the header comprising destination addresses that are identical to the destination addresses included in headers of the multicast data packets and information of a number of the multicast data packets included in the multicast aggregation packet.

2. The apparatus of claim 1, wherein each of the at least two data sections of the unicast and multicast aggregation packets respectively precedes a corresponding one of the two unicast and multicast data packets.

3. The apparatus of claim 1, wherein each of the at least two data sections of the unicast and multicast aggregation packets comprises length information of each of the respective unicast and multicast data packets.

4. The apparatus of claim 3, wherein the length information comprises information of a data length of each of the unicast and multicast data packets.

5. The apparatus of claim 1, wherein each of the at least two data sections of the unicast and multicast aggregation packets respectively comprises a length information section abutting a corresponding one of the unicast and multicast data packets and comprising only the length information of the corresponding one of the unicast and multicast data packets.

6. The apparatus of claim 1, wherein the aggregation module is further configured to transmit the unicast aggregation packet according to an acknowledgement (ACK) policy, and transmit the multicast aggregation packet according to a Non-ACK policy.

7. A method for generating an aggregation packet in a communication apparatus of a wireless communication system, the method comprising:
    receiving data packets in a buffer manager of the communication apparatus;
    determining at least two of the received data packets comprising a same destination address and identical quality of service (QoS) information as unicast data packets;
    determining at least two of the received data packets comprising different destination addresses and identical QoS information as multicast data packets;
    aggregating, by an aggregation module of the communication apparatus, the unicast data packets, separately from the multicast data packets, to form a signal unicast aggregation packet; and
    aggregating the multicast data packets, separately from the unicast data packets, to form a single multicast aggregation packet,
    wherein each of the unicast and multicast aggregation packets comprises at least two data sections and a header comprising a destination address,
    wherein the unicast aggregation packet comprises the header comprising the destination address that is identical to the destination address included in a header of each of the unicast data packets, and wherein the multicast aggregation packet comprises the header comprising destination addresses that are identical to the destination addresses included in headers of the multicast data packets and information of a number of the multicast data packets included in the multicast aggregation packet.

8. The method of claim 7, wherein each of the at least two data sections of the unicast and multicast aggregation packets respectively precedes a corresponding one of the unicast and multicast data packets.

9. The method of claim 7, wherein each of the at least two data sections of each of the unicast and multicast aggregation packets comprises length information of each of the respective unicast and multicast data packets.

10. The method of claim 9, wherein the length information comprises information of a data length of each of the unicast and multicast data packets.

11. The method of claim 7, wherein each of the at least two data sections of the unicast and multicast aggregation packets respectively comprises a length information section abutting a corresponding one of the unicast and multicast data packets and comprising only length information of the corresponding one of the unicast and multicast data packets.

* * * * *